(12) United States Patent
Sabry

(10) Patent No.: US 7,947,352 B2
(45) Date of Patent: May 24, 2011

(54) FLEXIBLE VCD HAVING DOMED CENTER AND METHOD OF MAKING THEREOF

(76) Inventor: Mohamed Mohab Sabry, Rancho Cucamonga, CA (US)

( * ) Notice: Subject to any disclaimer, the term of this patent is extended or adjusted under 35 U.S.C. 154(b) by 676 days.

(21) Appl. No.: 11/799,208

(22) Filed: Apr. 30, 2007

(65) Prior Publication Data

US 2008/0268196 A1    Oct. 30, 2008

(51) Int. Cl.
*B32B 3/02*    (2006.01)

(52) U.S. Cl. ...................................... 428/64.1; 428/64.4

(58) Field of Classification Search ......................... None
See application file for complete search history.

(56) References Cited

U.S. PATENT DOCUMENTS

| | | | | |
|---|---|---|---|---|
| 5,999,513 A | * | 12/1999 | Arakawa et al. | 369/282 |
| 6,078,560 A | * | 6/2000 | Kashiwagi | 369/275.5 |
| 6,404,730 B2 | * | 6/2002 | Yeo et al. | 369/281 |
| 6,411,594 B1 | * | 6/2002 | Yamazaki | 369/282 |
| 6,743,527 B2 | * | 6/2004 | Hisada et al. | 428/846.9 |
| 6,865,745 B2 | * | 3/2005 | Myrtle | 720/724 |
| 2003/0161255 A1 | * | 8/2003 | Kikuchi et al. | 369/280 |

* cited by examiner

*Primary Examiner* — Elizabeth Mulvaney
(74) *Attorney, Agent, or Firm* — Steins & Associates, P.C.

(57) ABSTRACT

A Flexible VCD Having Domed Center and Method of Making Thereof is disclosed. The disc will has a flat data storage section of its substrate that is less than 0.7 millimeters thick, while the central region of the disc is defined by a dome structure adjacent to the spindle aperture that is of standard digital disc thickness. The disc is thin enough such that its substrate is flexible. The dome structure is shaped to provide the widest compatibility with player/recorders, as well as with disc printing systems. Disc versions are available that provide conical dome structures, as well as slivered dome structures of both conical and rectangular cross-section. The method for manufacturing the discs simply requires the replacement of the conventional stamper holder with a stamper holding having a non-flat face.

20 Claims, 12 Drawing Sheets

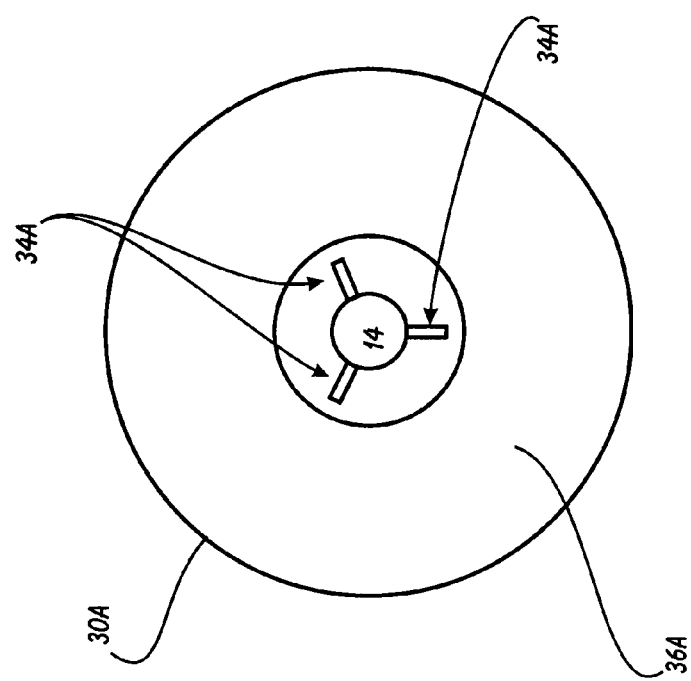
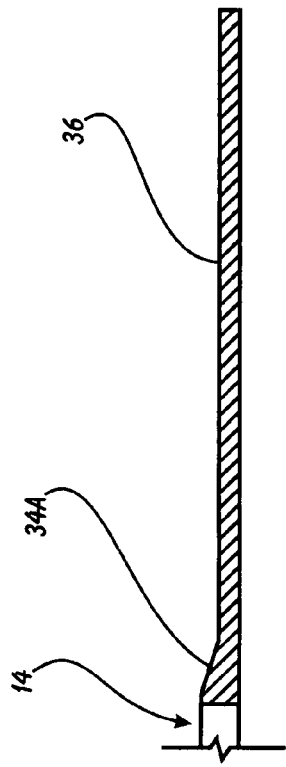
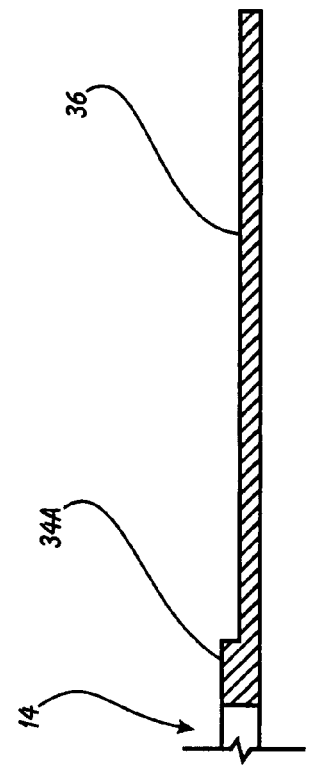
FIGURE 10A
FIGURE 10B
FIGURE 10C

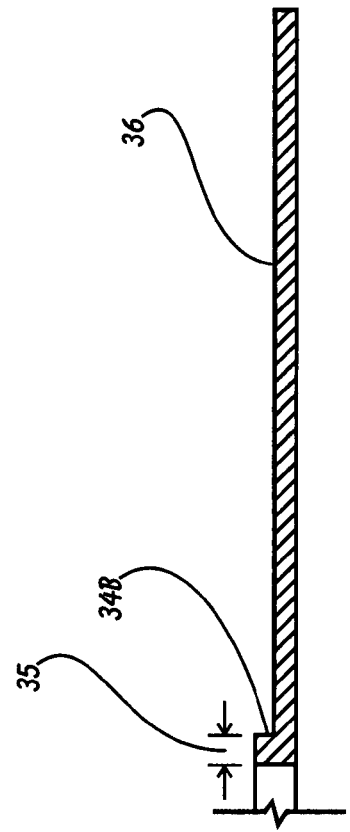
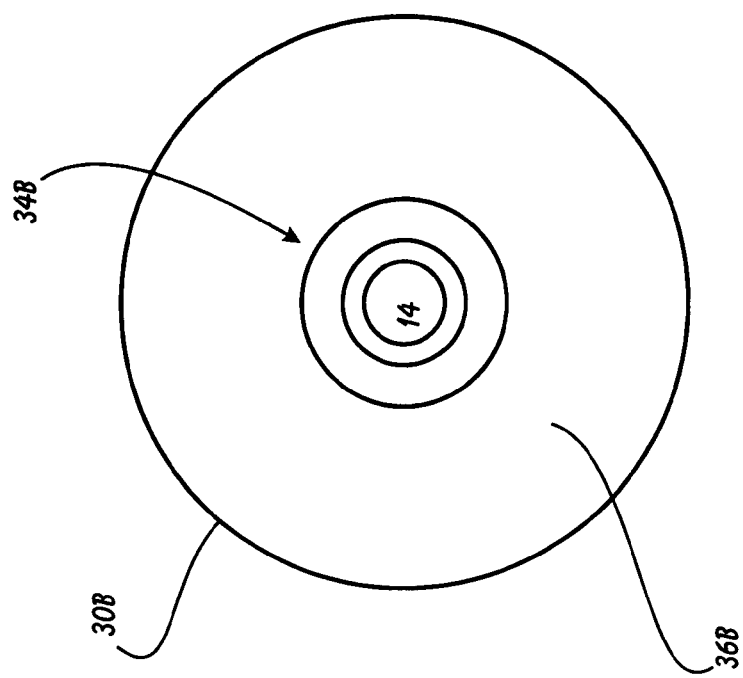
FIGURE 11B
FIGURE 11A

FLEXIBLE VCD HAVING DOMED CENTER AND METHOD OF MAKING THEREOF

BACKGROUND OF THE INVENTION

1. Field of the Invention

This invention relates generally to digital recording media and, more specifically, to a Flexible VCD Having Domed Center and Method of Making Thereof.

2. Description of Related Art

Portable storage of digital electronic data is a rapidly-developing field. The focus of the present invention is that of laser-readable (and writable) discs. Laser-readable disc types are generally Compact Discs (including CDs-prerecorded, CDRs-recordable, and CDRWs-rewritable) and Digital Video Discs (including DVDs-prerecorded, DVRs-recordable, and DVRWs-rewritable). Each of these disc designs and formats have similar basic structural configurations, as depicted in FIG. 1.

FIG. 1 is a perspective view of a conventional laser-readable disc 10. The conventional disc 10 has a plastic substrate 12 defined by a central spindle hole 14 formed therethrough. Standard CDs and DVDs have a substrate 12 defined by a 120 millimeter diameter 16 and a thickness 18 of 1.2 millimeters. While the standard disc 10 has a perimeter edge 20 that is circular, other shapes (and sizes) are readily available—of particular note is the business-card-sized disc. Data is stored on the disc via a laser readable (and optionally writable and rewritable) surface depicted here as the data storage area 21. The basics of the laser reading/writing technology will be discussed in connection with FIG. 2.

FIGS. 2A and 2B are partial cutaway side views of conventional compact and digital video discs, respectively. The conventional compact disc (CD, CDR, CDRW) 10A is defined by a substrate 12 having a thickness 18 that is 1.2 millimeters both at the perimeter edge 20 and at the central spindle hole 14. The substrate 12 is further defined by a top (recording) surface 22 and a bottom (read) surface 24. This is to say that the disc player/recorder's laser projects upwardly towards the disc substrate 12 from the bottom (at least in the depicted orientation). The laser light actually passes through the substrate 12 until it is reflected back by the bottom side of the top (recording) surface 22. The digital data is stored as a sort of texture on the top (recording) surface 22; the texture effects the way in which the laser light is reflected back down to the laser reader, which is interpreted as data in a standardized format. Of course other important elements are a part of CDs and DVDs, such as the type of reflective coating applied to the recording surface (which can determine whether the disc is rewritable or recordable), as well as any decorative films or colorations applied above that.

FIG. 2A depicts the structure of a conventional digital video disc (DVD, DVR, DVRW). The conventional DVD is actually comprises of two thin discs bonded together. While the overall disc thickness 18 is 1.2 millimeters at the perimeter edge 20 and the spindle hole 14, this overall substrate thickness is actually made up of a top substrate element 12A bonded atop the bottom substrate element 12B. The bottom substrate element 12B is actually the data-storing portion of the disc 10B. The top (recording) surface 22 is actually the top surface of the bottom substrate element 12B. Of course, the bottom (read) surface 24 is the bottom surface of the bottom substrate element 12B. The bottom substrate element 12B has a disc thickness of 0.6 millimeters, which means that the depth of the disc as read by the laser is only 0.6 millimeters.

The top substrate element 12A, which is also 0.6 millimeters thick, provides really no functional benefit to the disc 10B beyond making it stiffer than the bottom substrate 12B alone would be, and further providing the additional thickness necessary to provide an overall disc thickness 18 of 1.2 millimeters.

A critical aspect of the configuration of CDs and DVDs is the thickness of the disc substrate directly adjacent to the spindle hole 14. When a disc is loaded for playing/recording in a disc player, the player will actually clamp down on the disc over the spindle hole 14. The player will then conclude by that the disc top surface 22 or 26 is at the same level as the top of the disc clamp. The laser will then be energized to determine the disc depth/thickness to the top (recording) surface 22. In the case of a CD 10A, the player/recorder will detect a depth of 1.2 millimeters, while in the case of a DVD 10B, the player/recorded will detect a depth of 0.6 millimeters. This detected depth is a way for the player/recorder to confirm whether the disc is a CD or a DVD. As such, conventional CD and DVD players and recorders rely upon the thickness of the disc under the disc clamp (in the player) to determine whether a CD or a DVD is being read. If there is a non-standard depth, or a non-standard disc thickness 18 adjacent to the spindle hole 14, the error will prevent the disc from being reliably read on all player/recorders.

As discussed above, the extra substrate element included with a conventional DVD is not involved in the actual data recording and reading (at least beyond giving the player its initial focus check). There are, however, limitations to the usefulness of the DVD introduced because of this extra thickness. First, if the DVD was thinner (i.e. 0.6 millimeters), it would be flexible. A flexible DVD could be very popular in the context of mass mail advertising (such as in magazines); now the discs have to remain flat. Furthermore, the second substrate is simply wasted material, its elimination would be cost effective and more environmentally conscious. Finally, less material will reduce mold processing time as well as eliminating a production step involving the bonding of the top substrate element 12A to the bottom substrate element 12B.

SUMMARY OF THE INVENTION

In light of the aforementioned problems associated with the prior systems and methods, it is an object of the present invention to provide a Flexible VCD Having Domed Center and Method of Making Thereof. The preferred disc will have a flat data storage section of its substrate that is less than 0.7 millimeters thick, while the region of the disc should be defined by a dome structure adjacent to the spindle aperture that is of standard digital disc thickness. The disc should be thin enough to allow its substrate to be flexible. The dome structure should be shaped to provide the widest compatibility with player/recorders, as well as with disc printing systems. Disc versions should be available that provide conical dome structures, as well as slivered dome structures of both conical and rectangular cross-section. The method for manufacturing the discs should be limited to replacing the conventional stamper holder with a stamper holding having a non-flat face.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 10A-10C are top and partial cutaway side views, respectively, of a first alternative embodiment of the flexible digital video disc of the present invention;

FIGS. 11A and 11B are a top and a partial cutaway side view, respectively, of a second alternative embodiment of the flexible digital video disc of the present invention.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Flexible VCD Having Domed Center and Method of Making Thereof.

Figure 1:
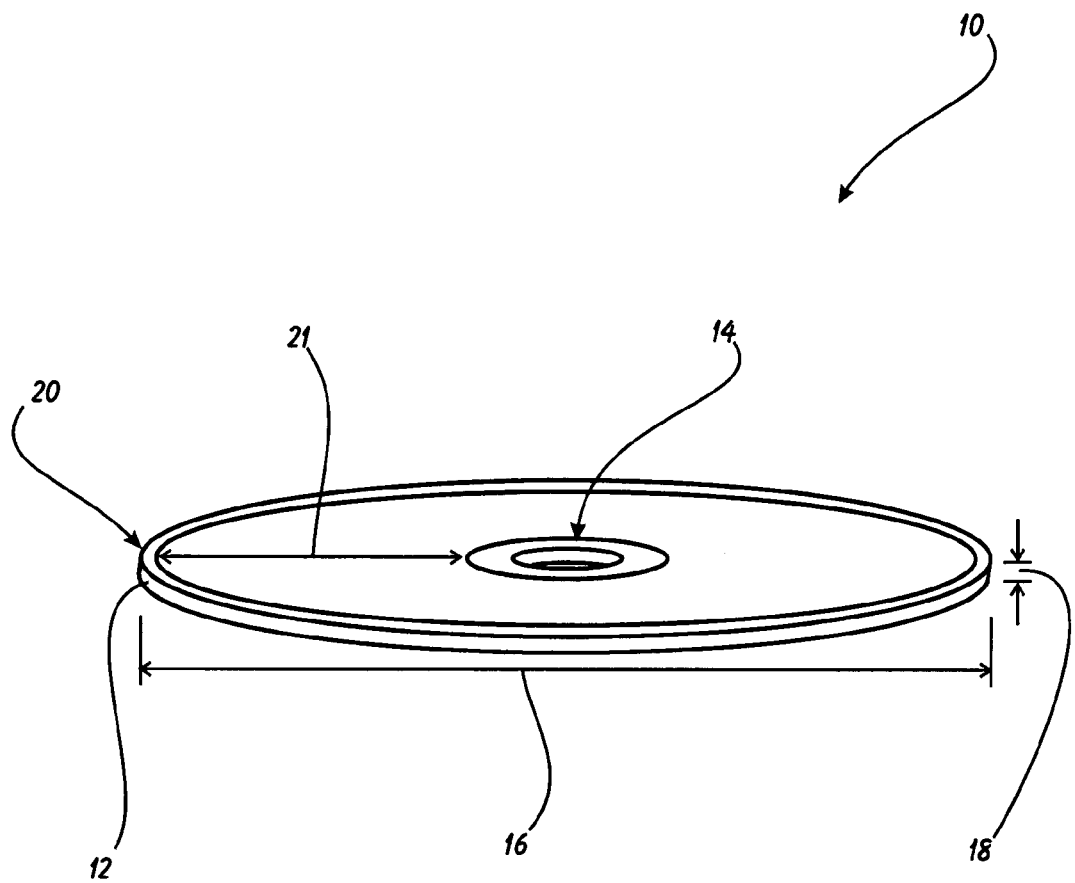
FIG. 1 is a perspective view of a conventional laser-readable disc.
Figure 2A:
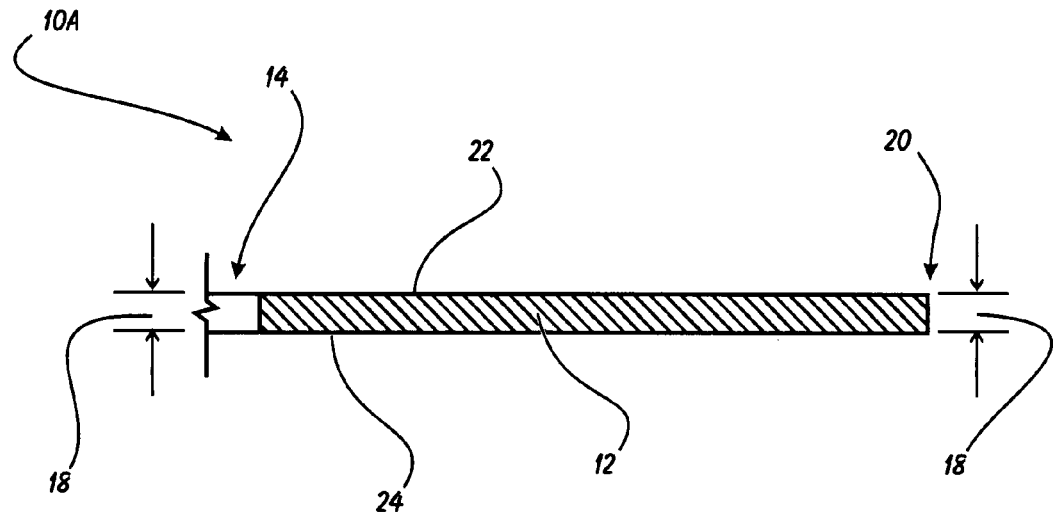
FIGS. 2A and 2B are partial cutaway side views of conventional compact and digital video discs, respectively.
Figure 2B:
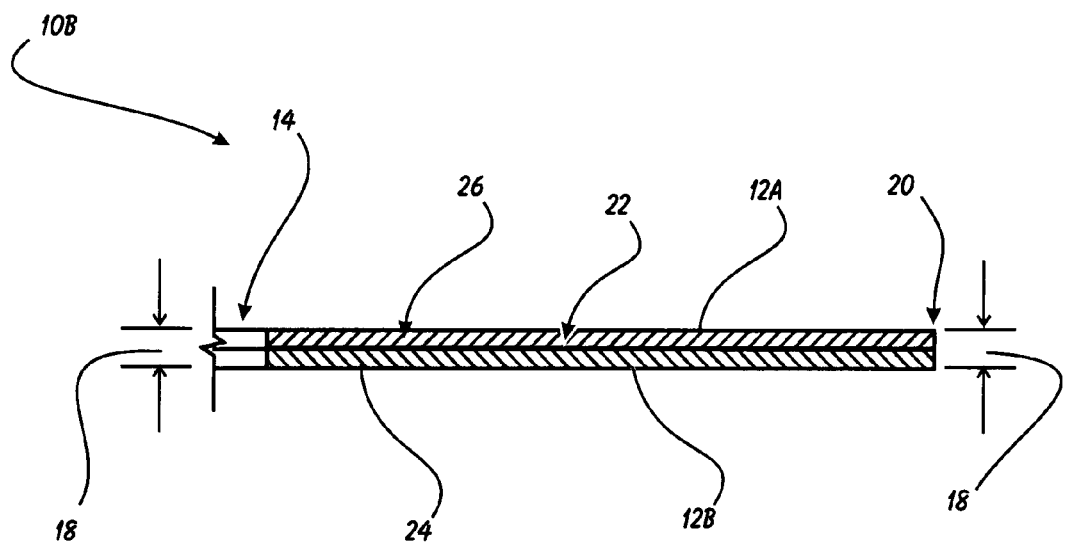
Figure 3:
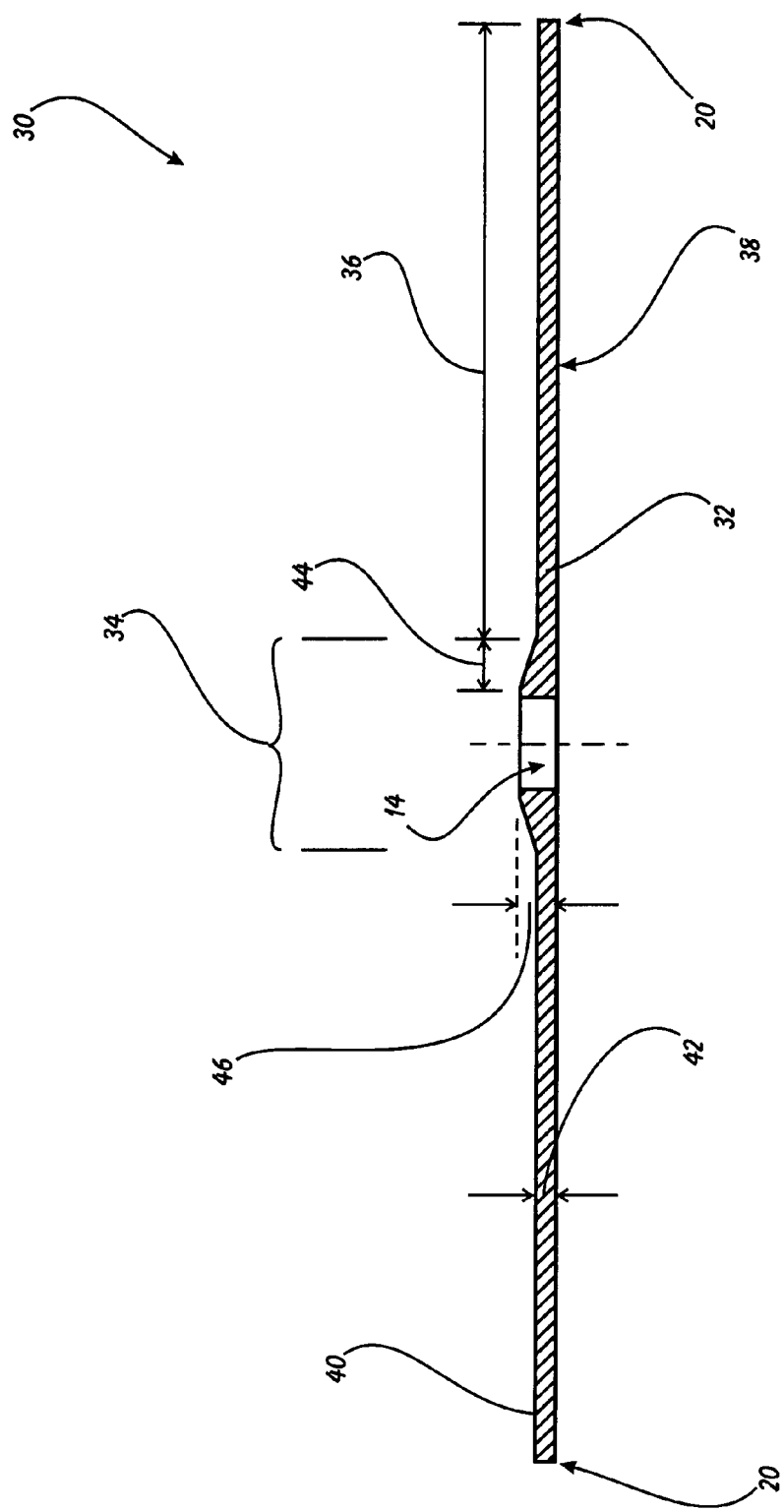
FIG. 3 is a cutaway side view of a preferred embodiment of the flexible digital video disc of the present invention.

The present invention can best be understood by initial consideration of FIG. 3. FIG. 3 is a cutaway side view of a preferred embodiment of the flexible digital video disc 30 of the present invention. Unlike the conventional digital video disc discussed above in connection with FIG. 2B, this disc 30 is not of a uniform thickness across its cross-sectional profile. Instead, the disc 30 has a thin outer portion 36, and a thick center portion 34. Directly adjacent to the spindle hole, the disc thickness 46 is 1.2 millimeters, while the thin outer portion 36 of the substrate 32 is only 0.6 millimeters.

The "domed" center portion 34 of this disc 30 exhibits a specific profile in its cross section. The thickness of the substrate 32 first begins to gradually thicken beginning at 45 millimeters from the perimeter edge 20 of the convention circular disc. This is precisely 55 millimeters from the center of the disc (a non-circular disc would use this center-centric dimension). The purpose of this thickened center portion 34 is to "fool" the digital disc player/recorder into believing that the entire disc 30 is of standard thickness (i.e. 1.2 millimeters). The profile of this embodiment of the domed center portion 34 is to slope upwardly to form a flat-topped cone, with the slope raising 0.6 millimeters (rise) over the span of 7.0 millimeters (run). While other profiles may be suitable, as will be discussed below in connection with FIGS. 10-12, this particular profile has been demonstrated to give substantial benefits.

The thin outer portion 36 makes the disc 30 deformable, or "flexible," which enables the disc 30 to be used in a wider variety of applications. Specifically, this flexible digital video disc 30 can be safely enclosed within a magazine without fear that curling the magazine will break the disc 30. Now turning to FIGS. 4A and 4B, we can see the entire form of the disc 30.

Figure 4A:
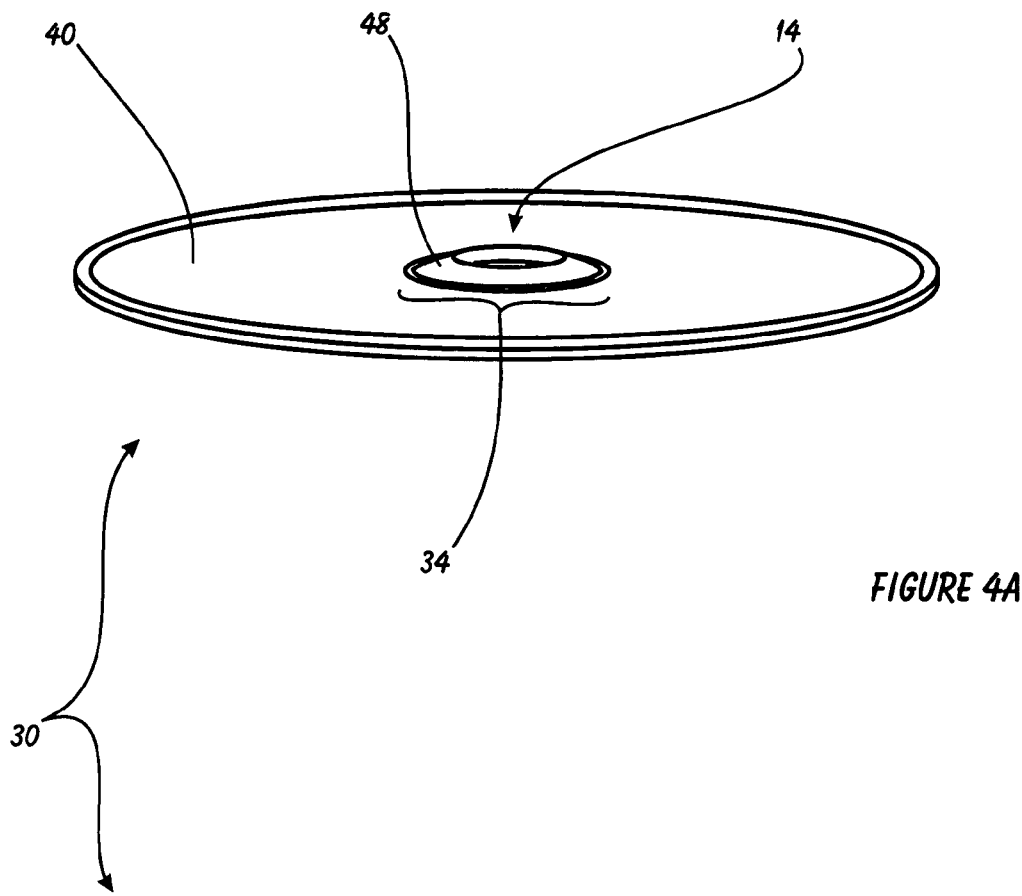
FIGS. 4A and 4B are top and bottom perspective views of the disc of FIG. 3.
Figure 4B:
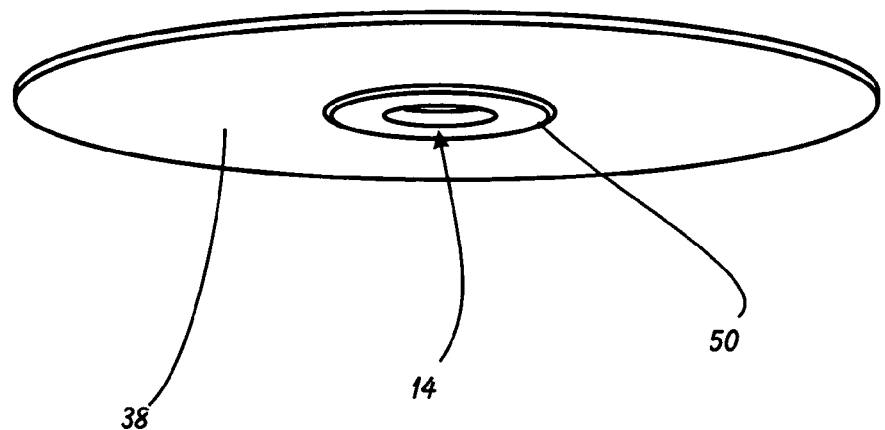

FIGS. 4A and 4B are top and bottom perspective views of the disc 30 of FIG. 3. As discussed above, the center dome 34 in this disc version has a flat-topped conical shape defined by a sloped top surface 48 protruding upwardly from the top (recording) surface 40. The shape of this center dome 34 has at least two significant benefits over any other versions of flexible digital discs—it has demonstrated universal compatibility with player/recorders, and it is compatible with standard disc printing processes (i.e. when indicia is added to the top surface 40 of the disc 30, such as for labeling).

Not all player/recorders clamp digital discs at the same location or in the same manner. Some player/recorders clamp directly adjacent to the spindle hole 14, while others tend to have a wider clamping ring area. Furthermore, some clamps are not continuous around the circumference of the spindle hole 14, but instead have a series of ridges or partial rings clamping down on the top of the disc. If a particular player/recorder does not "register" the correct 1.2 millimeter thickness of the disc, it will not play. The sloped top surface 48 of this embodiment of the disc 30 has proven to achieve universal compatibility with any and all player/recorders.

Regarding the printing of indicia atop the top surface 40 of the disc 30, the standard printing process involves the use of software to lay out the art work for the top of the disc, which then controls the printing or ink stamping of the indicia onto each disc. The software is designed to work with a standard, flat, smooth top surface 40. Any sharp protrusions from the top surface 40 tend to interfere either with the layout of the artwork, or with the actual functioning of the print head or stamp. The sloped top surface 48 of this embodiment of the disc 30, due to its gradual upslope and absence of sharp edges, has proven to be fully compatible with standard software and printing or stamping systems. Since the print function is conducted in mass production on standard equipment, it is critical that no special operational or equipment modifications are necessary.

As depicted in FIG. 4B, as with a standard CD or DVD, the disc 30 also has a centering ring 50 protruding downwardly from the bottom (read) surface 38 of the disc 30. The centering ring 50 engages a cooperatively located groove in the platter of the player/recorder in order to assist in centering the disc 30 within the player/recorder. Now that we have discussed the structural aspects of the present disc 30 embodiment, we can turn to the novel production process by first discussing the prior art method of disc production.

Figure 5:
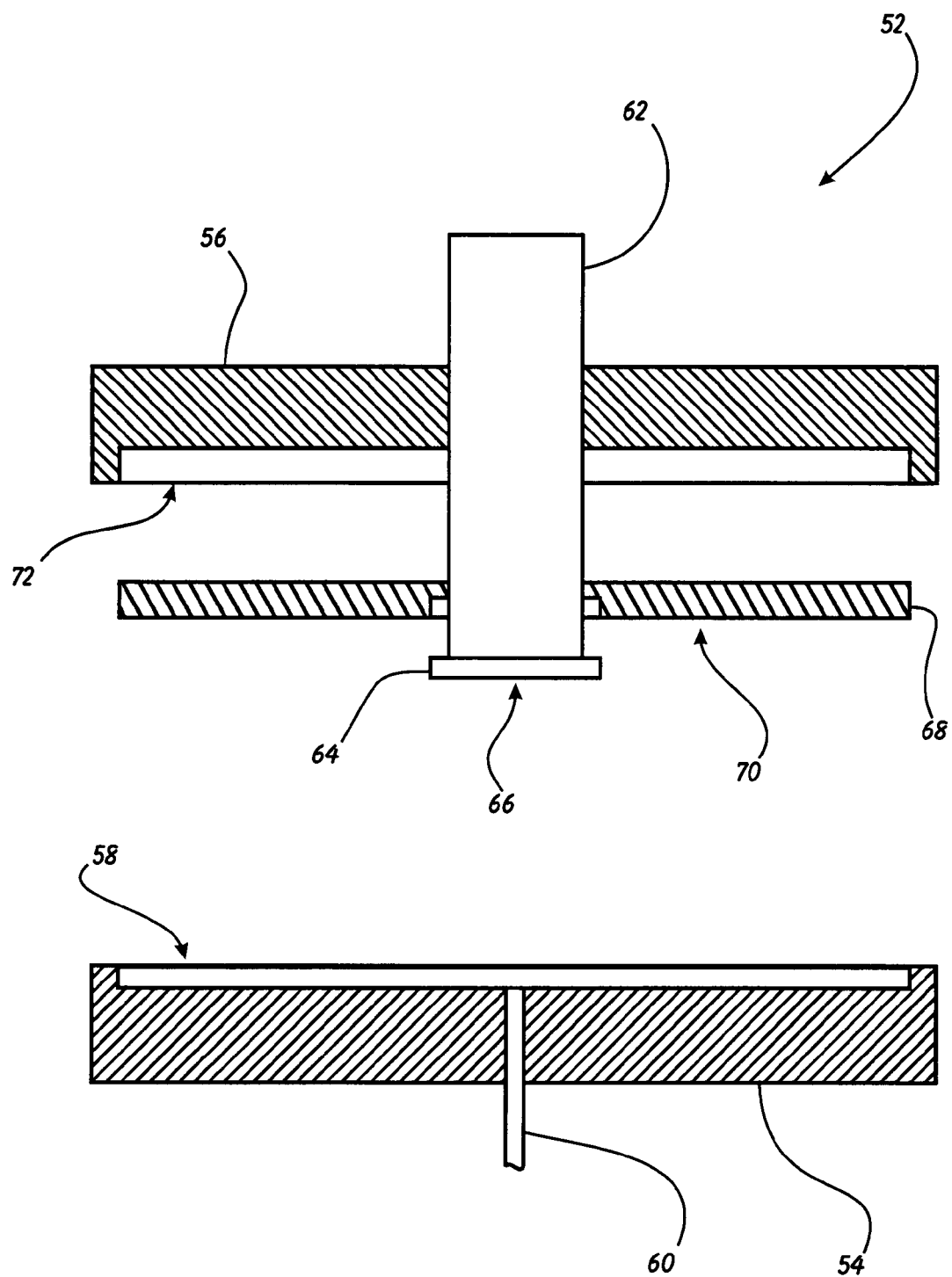
FIG. 5 is an exploded cutaway side view of the mold assembly for a conventional digital video disc.

FIG. 5 is an exploded cutaway side view of the mold assembly 52 for a conventional digital video disc. The manufacturing process for a conventional digital disc is typically by injection molding. A pelletized plastic material is injected into a mold form; once full, the mold is heated to a predetermined temperature which causes the pellets or beads to expand and/or coagulate into a solid plastic piece. The molded disc is then cooled and removed from the mold. The top (recording) surface of the disc is molded either with the data (for laser reading) formed into it, or if a recordable or rewritable disc, the top (recording) surface is prepared with no data recorded therein. Later processing steps include the application of specialized metalized layers atop the plastic top surface of the disc, which enables the laser to read and/or record the data on the top (recording) surface of the disc.

The conventional mold assembly 52 is comprised of a stationary mold half 54 and a moving mold half 56. In the depicted version, the bottom half is stationary and the top half is moving (or movable), however a variety of equipment types are available (e.g. the moving and stationary halves could be the reverse from that depicted here), and the depicted arrangement is only one example.

The stationary mold half 54 has a recessed section 58, which generally is the mold form for the bottom (read) surface of the disc. Although not depicted here, there would normally be a groove in the bottom surface of the recessed portion 58 to create the centering ring (see FIG. 4B) in the bottom surface of the disc. The plastic beads are injected into the mold 52 via the plastic injection port 60, shown here generally centered in the stationary mold half 54.

The moving mold half 56 also has a recessed section 72, however this section 72 does not create a molded surface of the disc, but rather is a "pocket" for receiving a stamper 68. The stamper 68 is the form to create the top surface of the disc. The molding equipment must be standardized to form the perimeter and bottom surface disc shape, but the top surface of the disc must be customizable so that the same molding equipment can produce custom discs (e.g. prerecorded, recordable or rewritable). To change a disc's data or its recordability, only the top surface of the disc will be different from other discs. As such, only the stamper 68 need be changed to set up the equipment to run a different type (or having different prerecorded data thereon).

The stamper 68 has a patterned face 70 that is a "negative" of the prerecorded data from the data master recording. The stamper 68 is held within the recessed section 72 of the moving mold half 56 by the stamper holder 62. The stamper holder 62 has a head 64 that actually holds the stamper 68 within the recessed portion 72. The head 64 is defined by a face 66 on its bottom side. As should be apparent, the face 66 forms a portion of the disc at its very center (that portion of the disc inside of the data recording zone), and generally is simply a flat smooth surface (or has a hole formed within it to allow a punch to form the spindle hole in the disc). Just prior to plastic injection, the mold assembly 52 will appear as shown in FIG. 6.

Figure 6:
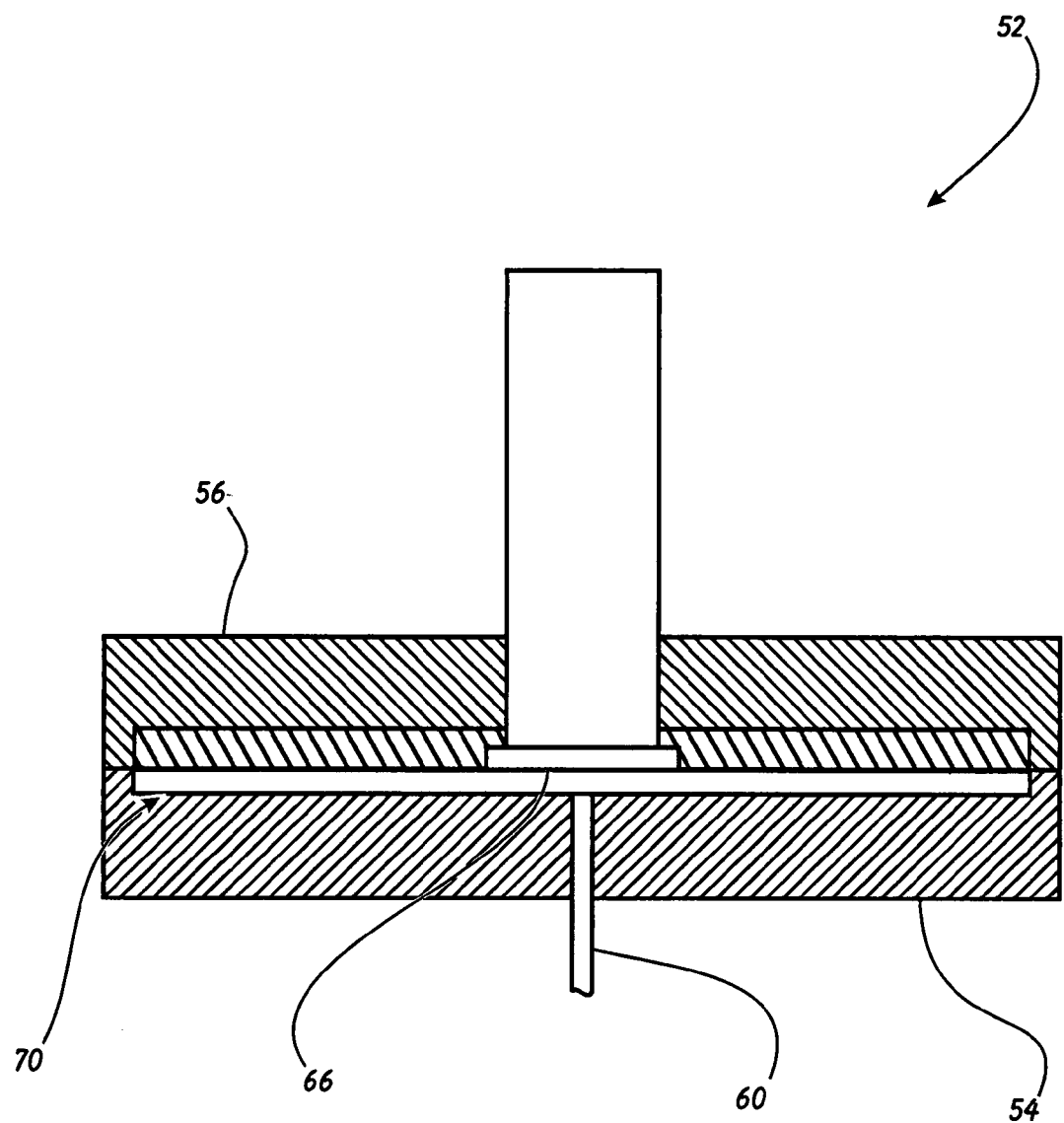
FIG. 6 is a cutaway side view of the mold assembly of FIG. 5 in its closed position.

FIG. 6 is a cutaway side view of the mold assembly 52 of FIG. 5 in its closed position. Here, the moving mold half 56 is pressed against the stationary mold half 54 to form the disc mold 72. The disc mold 72 is the void between the stamper patterned face 70 and stamper holder face 66 (on the top here) and the recessed portion formed within the stationary mold half 54. Once closed, plastic beads are injected into the mold 72 via the plastic injection port 60. The disc will be shaped as the "negative" of the disc mold 72. Now turning to FIG. 7, we can examine how the disc of the present invention is manufactured using standard equipment.

Figure 7:
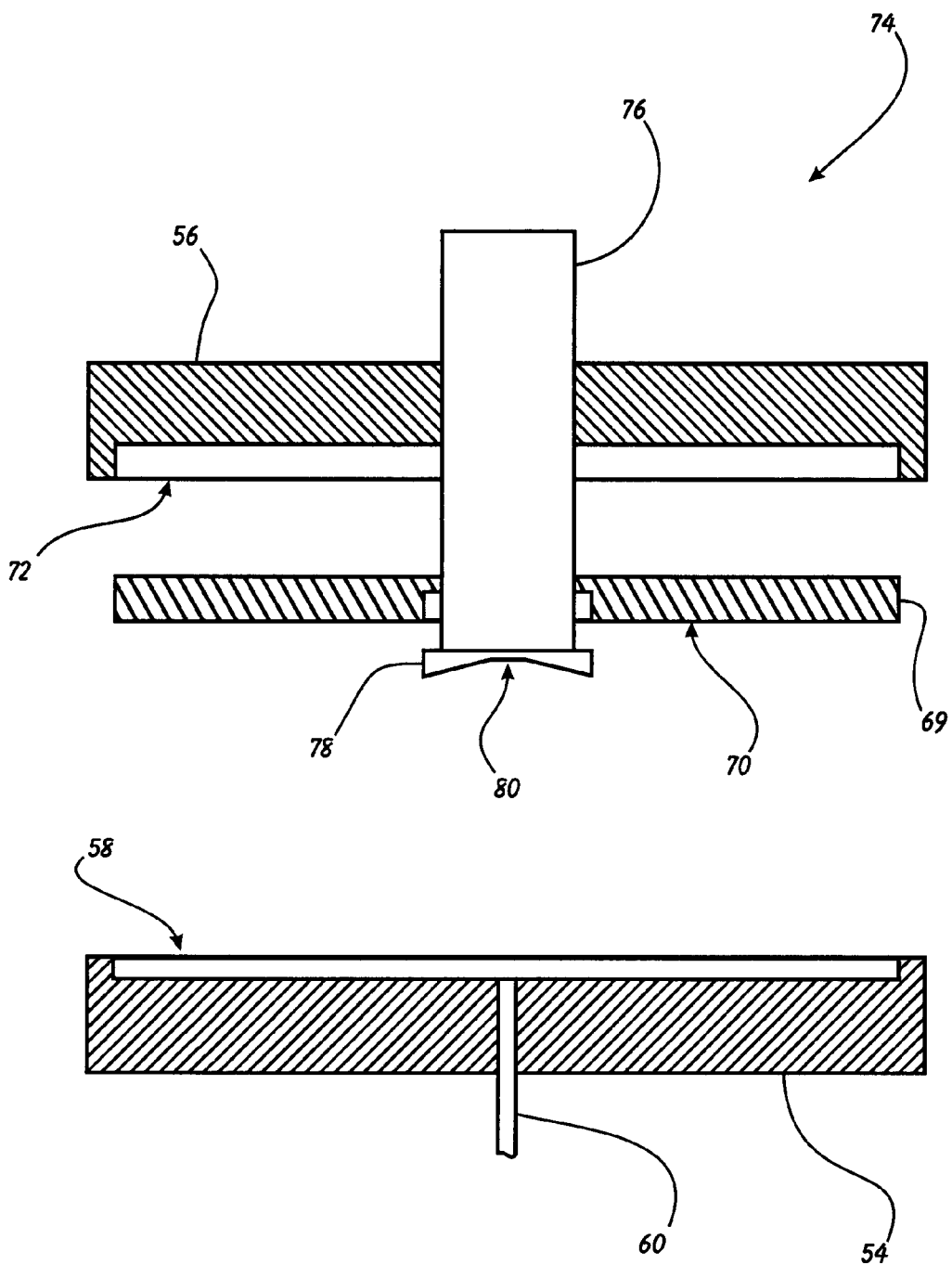
FIG. 7 is an exploded cutaway side view of the mold assembly for the disc of FIG. 3.

FIG. 7 is an exploded cutaway side view of the mold assembly 74 for the disc of FIG. 3. Virtually all of the components of the mold assembly 74 are unchanged from the conventional assembly of FIGS. 5 and 6—the stationary mold half 54, the moving mold half 56 (and their recessed sections 56 and 58), and even the stamper 69 are unmodified from the standard versions discussed above. The stamper 69 is shown here as being thicker than that shown in FIGS. 5 and 6 because the disc being formed in this mold assembly 74 is thinner than a standard CD. In fact, it is the same thickness as the bottom substrate element (see FIG. 2B) of a DVD, which is the standard thickness for that type of disc.

Figure 8:
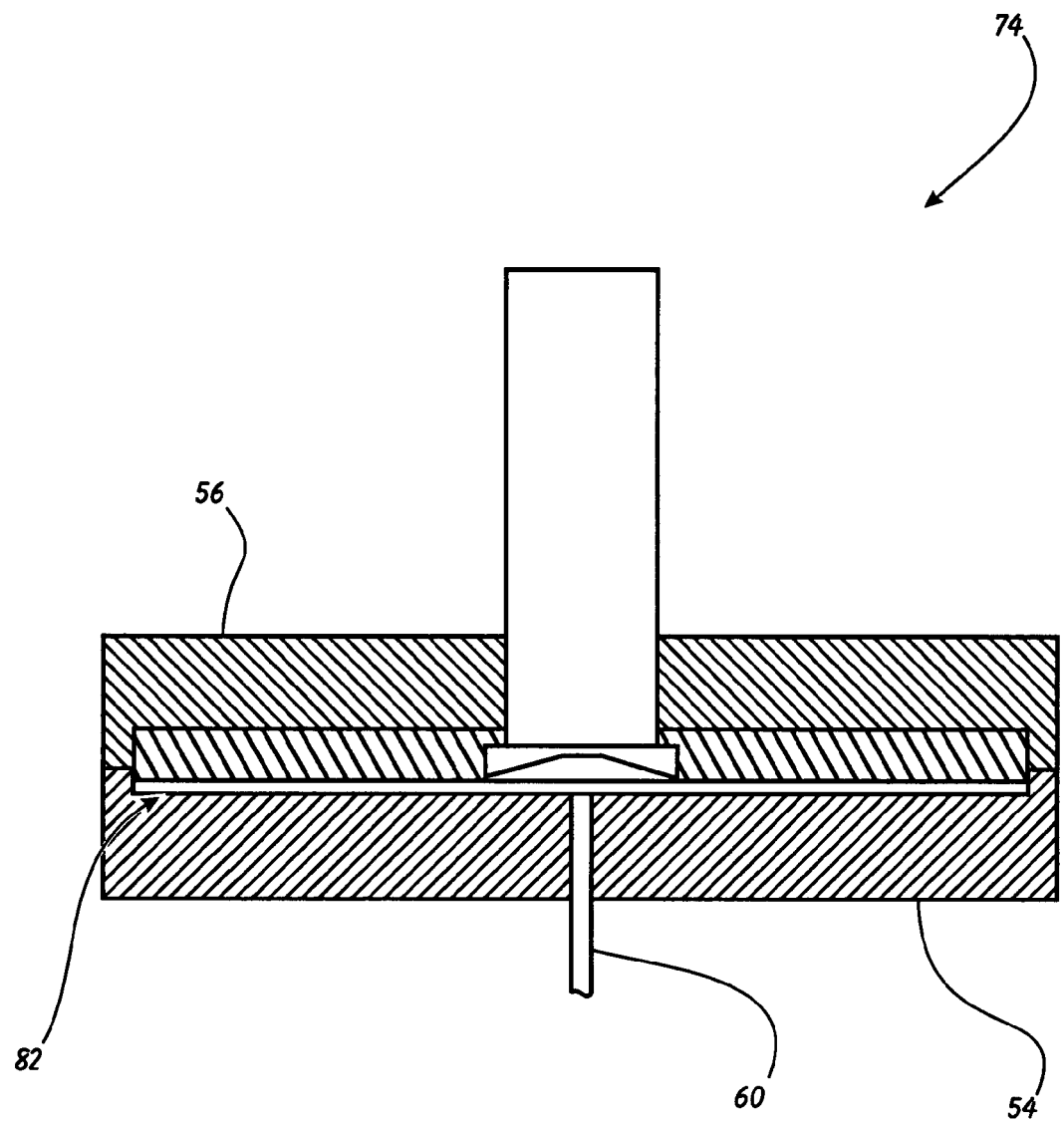
FIG. 8 is a cutaway side view of the mold assembly of FIG. 7 in its closed position.
Figure 9:
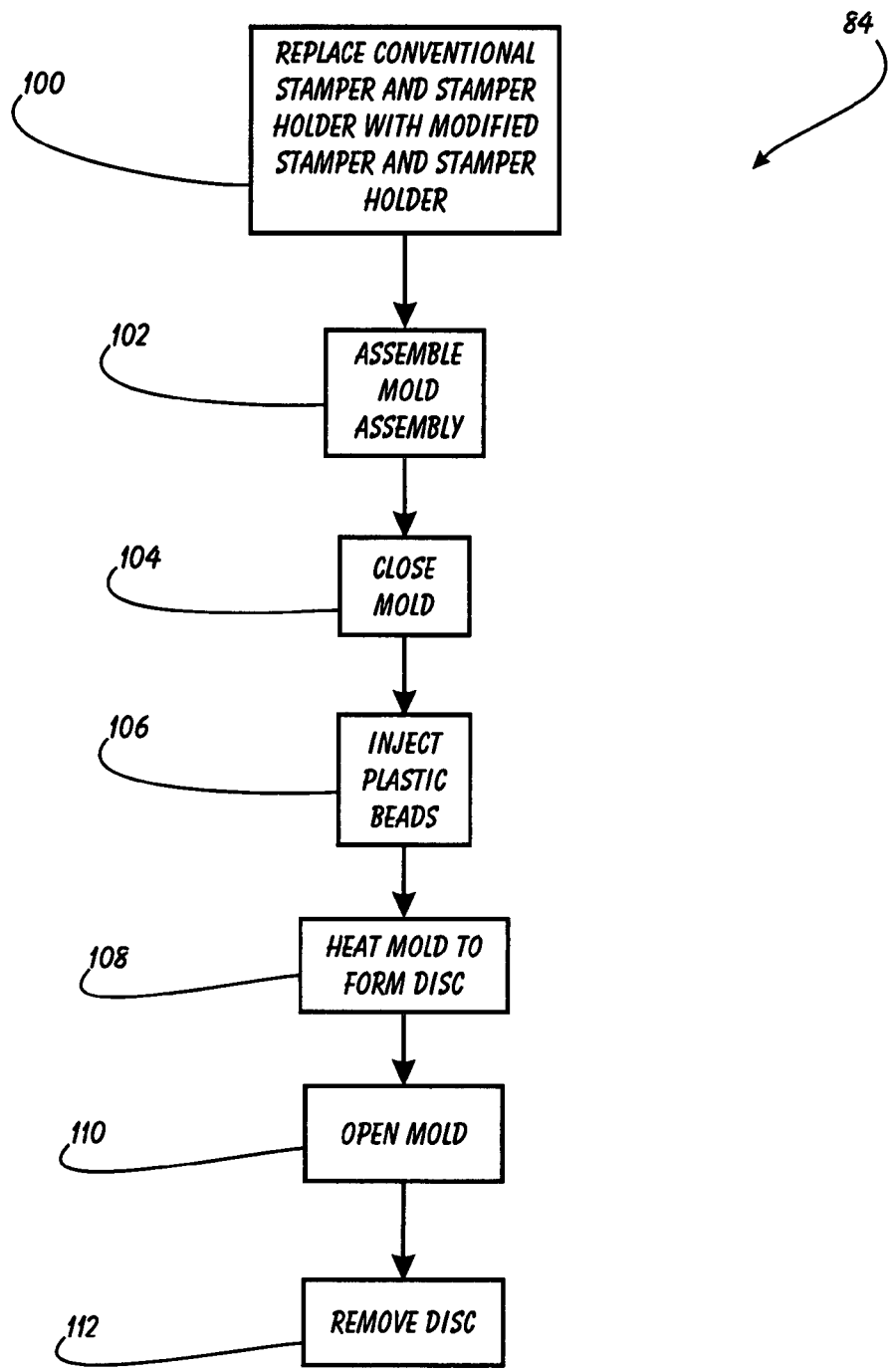
FIG. 9 is a block diagram of the preferred method of making the flexible digital video disc of FIG. 3.

What is new here is the modified stamper holder 76. The modified stamper holder 76 operates and is formed virtually identical to a conventional stamper holder, with one exception—the head 78 and face 80. The modified stamper holder 76 has a domed face 80 to create the raised center portion of the disc of FIG. 3. As shown in FIG. 8, when the mold assembly 74 is in a closed position, the disc mold 82 will have a domed section centered in the top surface of the disc, with the disc itself being one-half the thickness of the CD-type disc shown in FIGS. 5 and 6. Turning to FIG. 9, we will see that the manufacturing method, while unique, is fully compatible with conventional manufacturing equipment.

FIG. 9 is a block diagram of the preferred method 84 of making the flexible digital video disc of FIG. 3. First, the conventional stamper 68 (see FIG. 5) is replaced with a modified stamper 69 (see FIG. 7) if necessary, and the conventional stamper holder 62 (see FIG. 5) is replaced with a modified stamper holder 76 (see FIG. 7) 100. Next, the mold assembly 74 (see FIG. 7) is assembled 102, and the mold assembly 74 (see FIG. 8) is closed 104. Plastic beads are then injected 106 and the mold is heated 108 in order to form the disc 30 (see FIG. 3). The mold is later opened 110 (sometimes after cooling and other processing), and the disc is removed 112.

The only step in the method 84 that really differs from the conventional disc manufacturing method is the first one identified (step 100)—the exchange of the conventional stamper and stamper holder with modified stamper and stamper holder. No other modification to the conventional mold assembly is necessary.

Having fully discussed first embodiments of the present invention, we will examine several alternate embodiments of the disc of the present invention, commencing with the disc shown in FIGS. 10A-10C.

FIGS. 10A-10C are top and partial cutaway side views, respectively, of a first alternative embodiment 30A of the flexible digital video disc of the present invention. The disc 30A is formed in the same manner as discussed above in connection with FIG. 9, however the stamper holder face is formed so that a plurality of "dome slivers" 34A, rather than a solid "dome" is formed adjacent to the spindle hole 14. The outer thin portion 36A will then actually reach the spindle hole 14 in alternating arcs around its circumference. There may be three or more slivers 34A in spaced relation around the hole 14.

As shown in FIG. 10B, each dome sliver 34A may be sloped in its cross-sectional profile, just as with the first embodiment of the disc (FIG. 3). Alternatively, as shown in FIG. 10C, the slivers 34A may have a sharp edge, rather than a sloped top surface. In either case, the method of FIG. 9 will be suitable for forming the profile.

FIGS. 11A and 11B depict yet another preferred version 30B of the disc of the present invention. Rather than a sloped dome, this version has a dome ring 34B that is has squared edges and a thickness 35 of approximately 3 or 4 millimeters. This thin dome ring 34B has been determined to be functional with many player/recorders, and tends to use less material than the first disc embodiment.

Figure 12B:
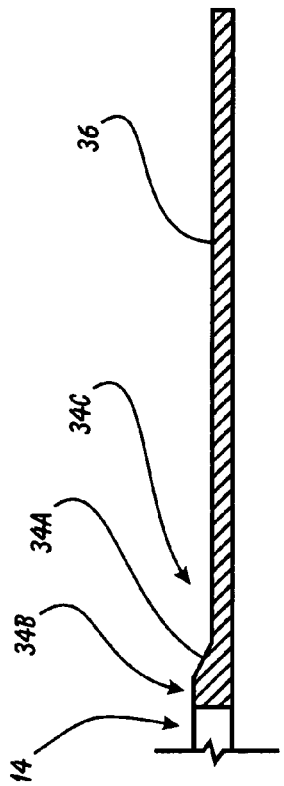
FIGS. 12A-12C are top and partial cutaway side views, respectively, of a third alternative embodiment of the flexible digital video disc of the present invention.
Figure 12C:
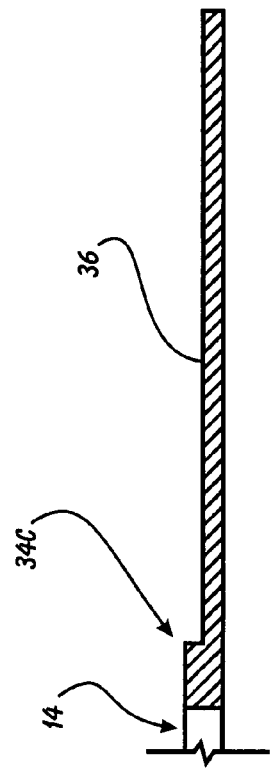
Figure 12A:
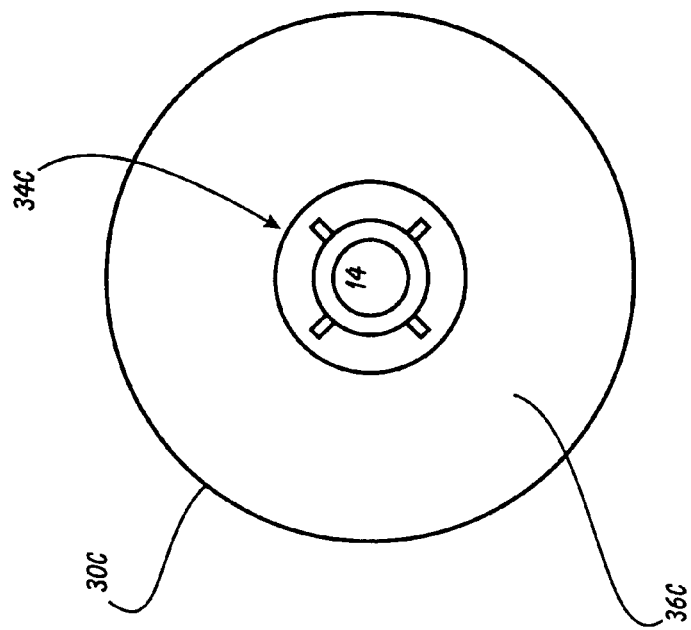

Finally, FIGS. 12A-12C depict yet another version 30C of the disc of the present invention. FIGS. 12A-12C are top and partial cutaway side views, respectively, of this third alternative embodiment. This disc version 30C is essentially a combination of the two versions shown in FIGS. 10A-10C and 11A-11B, that is, there is a combination ring/sliver dome 34C adjacent to the spindle hole 14. The cross-section may be as shown in FIG. 12B, with a central ring portion 34B of 3-4 millimeters, from which sloped dome slivers 34A extend radially. Alternatively, as shown in FIG. 12C, the dome slivers 34C may have squared edges. While more complex than the previous versions, this type will tend to be fully compatible with all player/recorders, while still providing modest material savings over the sloped dome version of FIG. 3.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A digital video disc, consisting essentially of:
a single solid piece of plastic material defining a substrate defined by a central portion and an outer portion, said central portion defined by a dome structure having a maximum thickness and said outer portion having a maximum thickness, said dome structure maximum thickness being greater than said outer portion maximum thickness, wherein said dome structure defines a cross-sectional profile, said cross-sectional profile having a solid ring-shaped center portion adjacent to a central spindle aperture wherein said spindle aperture is formed through said solid ring-shaped center portion a portion of which is said dome structure maximum thickness, said dome portion further defining three dimple-shaped dome slivers in radial spaced relation around said central spindle aperture.

2. The disc of claim 1, wherein said dome structure is further defined by a sloped top surface interconnecting the top surface of said flat-topped center portion and said outer portion, with said sloped top surface interconnecting said flat-topped center portion having a thickness of 1.2 millimeters and said outer portion having a thickness of 0.6 millimeters.

3. The disc of claim 2, wherein said outer portion defining a data storage area is approximately 0.6 millimeters in thickness.

4. The disc of claim 3, wherein said flat-topped center portion is approximately 1.2 millimeters in thickness.

5. The disc of claim 1, wherein each said dome sliver comprises a thickness of approximately 1.2 millimeters and said outer portion is approximately 0.6 millimeters.

6. The disc of claim 5, wherein each said dome sliver defines a cross-sectional profile, said cross-sectional profile having a generally conical shape with its thickest portion being flat-topped center portion directly adjacent to a central spindle aperture.

7. The disc of claim 1, wherein said dome structure comprises a central ring defining a generally flat top and a thickness of approximately 1.2 millimeters adjacent to said central spindle aperture in addition to said dome slivers.

8. The disc of claim 7, wherein said dome slivers extend radially outward therefrom.

9. The disc of claim 8, wherein said dome slivers are defined by a sloped top surface interconnecting a top surface of said central ring and said outer portion.

10. A method for making a digital video disc, comprising:
obtaining a stamper holder defined by a head and face thereof wherein said face is defined by a concave portion, said face concave portion further defined by a central ring adjacent to a central bore formed through said stamper holder and said face further defined by three dimple-shaped dome sliver in relative spaced relation and extending from said central ring;
holding a digital disc stamp within a first mold half with said stamper holder, wherein said disc stamp is thicker than a depth of a recessed section defined by said first mold half;
closing a second mold half against said first mold half to form a disc mold, whereby said digital disc stamp extends into a recessed section defined by said second mold half; and
injecting disc substrate raw material into said disc mold through a port formed in said second mold half.

11. The method of claim 10, wherein said obtaining step comprises obtaining a stamper holder defined by a head having a face defined by a conical concave portion extending from an outer surface portion coplanar with said digital disc stamper and into an inner surface portion at an apex of said concave portion.

12. The method of claim 11, wherein said obtaining step comprises obtaining a stamper holder defined by a head having a face further defined by a central ring adjacent to a central bore formed through said stamper holder, with said concave portion adjacent to said central ring.

13. The method of claim 12, wherein said obtaining step comprises obtaining a stamper holder defined by a head having a face wherein said concave portion is discontinuous around the circumference of said concave portion, said concave portion comprising at least two concave slivers around said circumference, said arcs in relative spaced relation.

14. The method of claim 13, wherein said obtaining step comprises obtaining a stamper holder defined by a head having a face where said concave slivers define a generally conical cross-section.

15. A digital video disc, comprising:
a single piece of material defining a generally flat data storage substrate portion defined by an upper surface and a lower surface, said substrate being optically transparent to predetermined light energy, said substrate having a spindle aperture formed therethrough and a thickened portion encompassing said spindle aperture, said generally flat data storage substrate defines a thickness of less than 0.7 millimeters and said thickened portion defines a thickness of at least 1.0 millimeters;
said thickened portion consisting essentially of a central ring adjacent to said spindle aperture having a thickness of at least 1.0 millimeters, and three dome segments in relative spaced relation around said central ring, each said dome segment having a generally conically shaped upper surface extending from said thickened portion to said storage substrate.

16. The disc of claim 15, wherein said central ring defines a generally flat top surface that forms a continuous, unbroken ring around said spindle aperture and a thickness of approximately 1.2 millimeters.

17. The disc of claim 16, wherein each said dome segment extends radially outward from the outer edge of said central ring such that its upper surface interconnects said top of said central ring to said substrate surface.

18. The disc of claim 17, wherein said thickened portion consists essentially of three said dome segments in relative spaced relation around said central ring.

19. The method of claim 10, wherein said first mold half of said holding step is movable and said second mold half of said closing step is stationary.

20. The method of claim 19, wherein said first mold half, said digital disc stamper, and said stamper holder of said holding step are all movable.

* * * * *